US012233293B2

(12) United States Patent
Johnson

(10) Patent No.: US 12,233,293 B2
(45) Date of Patent: Feb. 25, 2025

(54) WINDOW BREAKING DEVICE

(71) Applicant: SHATTER TACTICAL, LLC, Forest Lake, MN (US)

(72) Inventor: Joseph Johnson, Forest Lake, MN (US)

(73) Assignee: Shatter Tactical, LLC, Forest Lake, MN (US)

( * ) Notice: Subject to any disclaimer, the term of this patent is extended or adjusted under 35 U.S.C. 154(b) by 346 days.

(21) Appl. No.: 17/519,337

(22) Filed: Nov. 4, 2021

(65) Prior Publication Data

US 2022/0161063 A1 May 26, 2022

Related U.S. Application Data

(60) Provisional application No. 63/117,503, filed on Nov. 24, 2020.

(51) Int. Cl.
*A62B 3/00* (2006.01)

(52) U.S. Cl.
CPC .................................... *A62B 3/00* (2013.01)

(58) Field of Classification Search
CPC ................................ A62B 3/005; A62B 3/00
USPC ...................................................... 225/93, 1
See application file for complete search history.

(56) References Cited

U.S. PATENT DOCUMENTS

| | | | |
|---|---|---|---|
| 5,791,056 A | 8/1998 | Messina | |
| 6,223,441 B1 | 5/2001 | Parsons | |
| 6,383,092 B1 | 5/2002 | Ogg | |
| 7,887,211 B2 | 2/2011 | Summers | |
| 10,603,525 B2 | 3/2020 | Krueger et al. | |
| 11,583,705 B2 | 2/2023 | Krueger et al. | |
| 11,628,317 B2 | 4/2023 | Krueger et al. | |
| 2018/0042344 A1* | 2/2018 | Douglas | A44C 25/001 |
| 2020/0282241 A1* | 9/2020 | Krueger | B26F 3/00 |
| 2023/0047493 A1 | 2/2023 | Krueger et al. | |
| 2023/0321463 A1* | 10/2023 | Krueger | A62B 3/00 225/93 |

FOREIGN PATENT DOCUMENTS

| | | |
|---|---|---|
| CN | 108771798 A * | 11/2018 |
| CN | 209933870 U * | 1/2020 |

OTHER PUBLICATIONS

CN 209933870U, Translation (Year: 2023).*
CN108771798a, Translation (Year: 2023).*
Uniqative "X" Product Descriptions, <https://uniqative.com/2021/09/20/glass-breakers-featured-in-police-mag/> Retrieved from the Internet on Nov. 3, 2021.
Murrell, Deborah, Medieval Warfare Weapons, pp. 4-6; 2009.

(Continued)

*Primary Examiner* — Nhat Chieu Q Do
(74) *Attorney, Agent, or Firm* — Holzer Patel Drennan

(57) ABSTRACT

A window breaking device having a generally orb shape with a plurality of points. The window breaking device is configured to be a projectile, thrown at a window to break the window. No special tool is needed to throw the device to break the window. One particular device has a body having a plurality of point structures with an overall diameter of 0.5 inch to 2 inch, a weight of 0.5 ounce to 2 ounces, a density of point structures of at least 10 points per square inch, with each point structure having a height of at least 0.1 inch.

16 Claims, 6 Drawing Sheets

(56) References Cited

OTHER PUBLICATIONS

Website page www.by-the-sword.com/p-2463-morning-star-flail.aspx dated Oct. 25, 2016, obtained from archive.org on Aug. 7, 2023.
Website page www.by-the-sword.com/p-4979-single-ball-flail.aspx dated Oct. 25, 2016, obtained from archive.org on Aug. 7, 2023.
Website page www.by-the-sword.com/p-2467-classic-flail.aspx dated Oct. 25, 2016, obtained from archive.org on Aug. 7, 2023.
Website page www.metmuseum.org/art/collection/search/33866 dated Mar. 6, 2016, obtained from archive.org on Aug. 7, 2023.
Flail from the Royal Armouries Collections, printed from https://collections.royalarmouries.org/object/trac-object-1589.html on Jun. 26, 2023.
Mace from the Royal Armouries Collections, printed from https://collections.royalarmouries.org/object/trac-object-9483.html on Jul. 5, 2023.

* cited by examiner

WINDOW BREAKING DEVICE

CROSS-REFERENCE

This application claims priority to U.S. provisional application No. 63/117,510 filed Nov. 24, 2020, the entire contents of which is incorporated herein by reference for all purposes.

BACKGROUND

There is often a great need to be able to break an automobile (car or truck) window in a hurry. A windows-breaking emergency escape device is often used in emergency situations, such as a car falling into water, a car caught on fire, and also to liberate children or pets from inside the car (e.g., on hot days). In such situations, either the passengers in the car or persons outside of the car need to break a car window immediately to gain access to the interior of the car in a short and critical time.

Many window or windshield breaking tools are club-like or hammer-like tools, often having a blunt or sharp point with which to strike the glass to be broken. Some hammers have double-sided heads. Many of these tools include a blade or cutter for cutting a seatbelt. Some windshield breaking tools are extravagant, having USB charging ports. All of these, however, are held in the hand of the user while attempting to break the window.

Although the conventional windows-breaking emergency escape devices can be used to break car windows during the emergency, there is much room for improvement.

SUMMARY

The present disclosure is directed to a window breaking device having a generally orb shape with a plurality of points extending out from the orb. The window breaking device is configured to be a projectile, thrown at the window to break the window. No special tool or special strength or force is needed to throw the device to break the window. The window breaking device can be readily held in the user's (thrower's) hand.

One particular implementation described herein is a device having an orb-like body having a plurality of point structures. The device has an overall diameter of 0.5 inch to 2 inch, a weight of 0.5 ounce to 2 ounces, a density of point structures of at least 10 points per square inch, each point structure having a height of at least 0.1 inch.

Another particular implementation described herein is a method of breaking a window by throwing, without any undue force, one of the window breaking devices described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
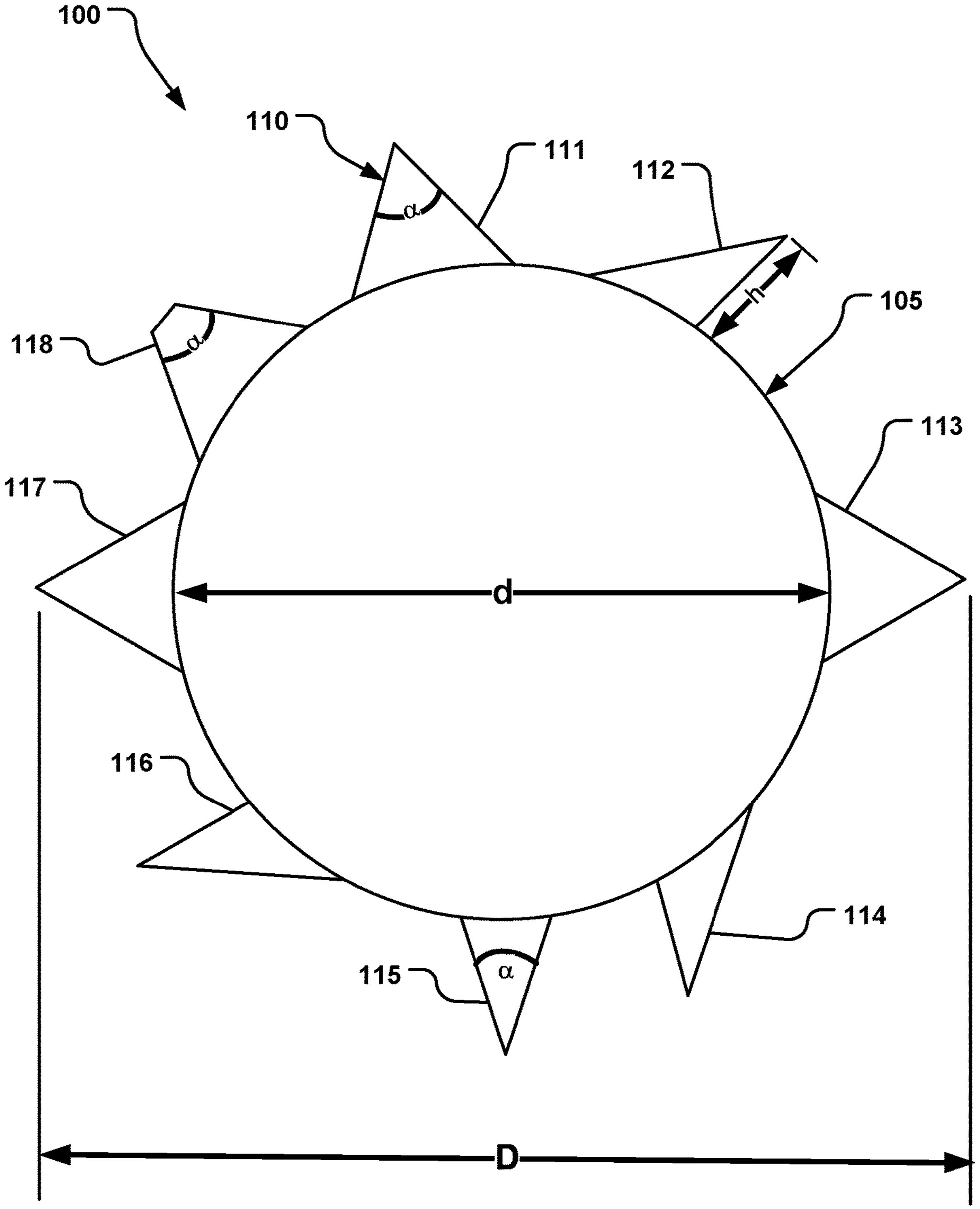
FIG. 1 is a schematic cross-sectional view of an example window breaking device.

As described above, the present disclosure is directed to a device for breaking or shattering glass, such as a window, an automobile windshield, an automobile side window, glass door, etc. from a remote distance. The user of the device does not maintain a hold or grip on or of the device to break the glass, but rather, the device is thrown against the glass; no portion of the device remains in the user's hand.

The window breaking device has a shape, size and weight configured to be readily held in the hand of a user, or, one who will throw the device. The device has a plurality of point structures or tips extending therefrom. Upon impact with the glass, at least one of the tips of the point structures of the device sufficiently damages (e.g., scratches, chips) the glass to impact the integrity of the glass, thus allowing the entire device to readily pass through the glass. The device is capable of breaking (shattering) standard glass windows, safety-glass windows (e.g., windshields), and windows having a film or coating thereon.

It is noted that although the following description uses the terminology "window" breaking device, it is to be understood that the device could be used to break or shatter other glass features.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 shows an example window breaking device 100, shown schematically in cross-section. The device 100 has a generally round or orb shaped body 105 that includes numerous extending point structures 110 thereon. The device 100 is void of any handle, lanyard, baton, connected thereto, but rather, the device 100 is generally round or orb-shaped. The body 105 has a diameter "d" and the overall device 100 has a diameter "D." Each of the point structures 110 has a height "h" measured from the outer surface of the body 105 to the point or farthest most tip of the point structures 110.

FIG. 1 shows the device 100 with various point structures 110 extending from the body 105, particularly, points 111, 112, 113, 114, 115, 116, 117, 118. This example shows different types of point structures 110 on the body 105, but in other implementations, all the structures 110 are the same; in some implementations, two or three different structures

110 are present on the body 105. The point structures 110 may differ by, e.g., height, shape, point angle, material, presence of a coating, central axis of the structure in relation to the radius of the body 105, etc.

In the particular example shown, the point structures 111, 113, 117 are the same, shown as pyramids or cones symmetrical about a central axis that extends from the center of the structure 111, 113, 117 and the body 105 to the tip of the structure 111, 113, 117 with the axis aligned with a radius of the body 105. The point structures 111, 113, 117 have an angle α of about 45 degrees. The structure 118 is similar to the structures 111, 113, 117, shown as a general-pyramid or cone symmetrical about a central axis that extends from the center of the structure 118 and the body 105 to the tip of the structure 118 with the axis aligned with a radius of the body 105, with the structure 118 having an angle α of about 45 degrees. This structure 118, however, has a truncated tip.

The point structure 115 is similar to the structures 111, 113, 117, shown as a pyramid or cone symmetrical about a central axis that extends from the center of the structure 115 and the body 105 to the tip of the structure 115 with the axis aligned with a radius of the body 105. However, the structure 115 has an angle α of about 30 degrees.

Each of the point structures 112, 114, 116 is nonsymmetrical with an axis that extends from the center of the structure 112, 114, 116 and the body 105 to the tip of the structures 112, 114, 116 that does not align with a radius of the body 105. In other words, the tip of the structures 112, 114, 116 does not extend radially out from the body 105 but instead is at an angle to a radius. For the structure 112, a side edge of the structure extends radially out from the body 105.

The body 105 has a diameter of at least 0.25 inch and no more than 3 inches, often no more than 2.5 inches. In some implementations, the body 105 has a diameter of at least 0.5 inch or at least 0.75 inches. In some implementations, the body 105 has a diameter no greater than 2 inches or no greater than 1.5 inches. Non-limiting example diameters include 0.75 inch, 0.8 inch, 0.85 inch, 0.9 inch, 1 inch, 1.1 inch, 1.2 inch, and 1.25 inch.

Although the orb-like body 105 shown in FIG. 1 is circular in cross-section, the body can have other shapes similar to an orb, including an octagon cross-section, a decagon cross-section, a heptagon cross-section, an oval cross-section, etc. The body 105 can have any number of faces or vertices; for example, the body 105 can be an icosahedron, a dodecahedron, a tetrahedron, a stellated octahedron, or a buckyball. In some implementations, the body 105 can have 50 faces or even 100 faces.

The point structures 110 have a height "h", measured from the body 105 to the tip of the point structure 110. The point structures 110 have a height of at least 0.05 inch or at least 0.1 inch and usually no more than 0.5 inch or no more than 0.4 inch. Example sizes of point heights include 0.15 inch, 0.125 inch, 0.1875 inch, 0.2 inch, and 0.25 inch. In most implementations, the height of the structures 110 does not vary in a device 100, but rather all the structures 110 have the same height.

Combining the body diameter and the height of the points, the overall device 100 can have a size of about 0.3 inch to as much of 3.5 inches, although smaller and larger size may be suitable, depending on the size of the palm of the user who will throw the device 100.

The overall weight of the device 100, including the body 105 and the points 110, is at least 0.5 ounce, in some implementations at least 0.75 ounce. The weight of the device 100 is generally no greater than 6 ounces, often no greater than 4 or 5 ounces. In some implementations, the weight is no greater than 3 ounces or 2.5 ounces or 2 ounces or 1.5 ounces. Non-limiting example weights include 0.75 ounce, 0.8 ounce, 0.9 ounce, 1 ounce, 1.1 ounce, 1.15 ounce, 1.16 ounce, 1.2 ounce, and 1.25 ounce.

The number of point structures 110 on the device 100 can vary greatly, depending on the shape and size of the structures 110 and, of course, the size of the body 105. As an example, a device 100 may have 10 points, or 20 points, or 25 points, or 30 points, or 50 points, or more. The point structures 110 may be distributed on the body 105 in a regular and/or symmetrical spacing (e.g., as rings or row around the body 105, as lines or stripes), or may be irregularly or randomly spaced.

The number of points per area on the device 100 is at least 5 points per square inch, in some implementations at least 10 points per square inch, in other implementations at least 15 points per square inch. In other implementations, the number of points is at least 50 points per square inch, or at least 75 points per square inch, or at least 100 points per square inch. As the size of the body 105 increases, so increases the total number of point structures 110 obtainable on the body 105. In some implementations, the point structures 110 are located on the body 105 in such a manner that adjacent point structure bases abut each other, providing no access to the body 105 itself.

The point structures 110 can have any suitable shape, however in most implementations the base of the point structure 110 at the body 105 will have a greater area than the tip of the point structure 110; in other words, the point structures are tapered. Examples of suitable 3-dimensional shapes for the point structure 110 include conical, pyramidal (e.g., three sided, four sided, five sided, etc.), obelisk.

In some implementations, the point structures 110 may not have an actual, sharp point but do have a sharp edge—e.g., a truncated pyramid or cone. For example, structure 118 is a truncated pyramid, having an angle α of about 45 degrees and terminating in a flat point. In some implementations, the structure itself may be truncated with a smaller secondary point or tip.

The structure may be defined by an angle α of at least 15 degrees and usually less than 90 degrees. In some implementations, the structure has an angle in the range of 30 degrees to 60 degrees, in other implementations, in the range of 30 degrees to 45 degrees.

As indicated above, the point structures 110 may be symmetric (see, e.g., structures 111, 113, 115, 117, 118) or non-symmetric (see, e.g., structures 112, 114, 116).

Examples of materials suitable for the body 105 and the point structures 110 include iron, ceramic (e.g., alumina), stainless steel, hardened steel (e.g., 1040 steel). The body 105 and the structures 110 may be the same material or they may be different materials; one or both of the body 105 and the structures 110 may be a combination of materials, e.g., layered, core, etc. The point structures 110 may be integral with the body 105 or may be formed separately and subsequently applied to the body 105. There may be a hardening coating on the tips, the entire point structure 110, or on the entire device 100. Examples of surface coatings include DLC (diamond-like coating), ceramic, zinc, and the like.

FIGS. 2 through 6 illustrate a window breaking device 200 that is not symmetrical in all directions, but is rotationally symmetrical about an axis; the device 200 has multiple pyramidal point structures and one conical point structure.

Figure 2:
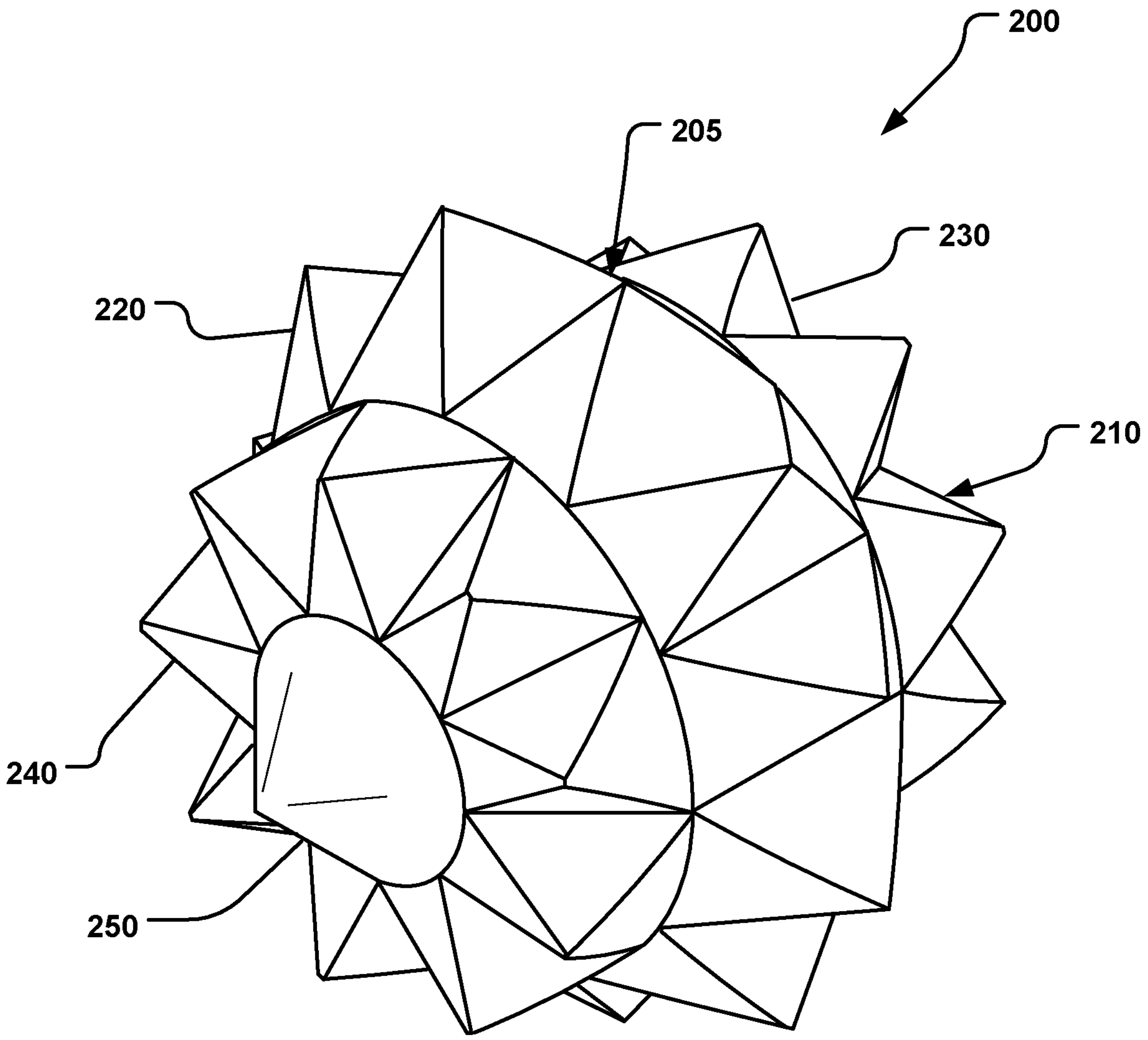
FIG. 2 is a perspective view of another example window breaking device.
Figure 3:
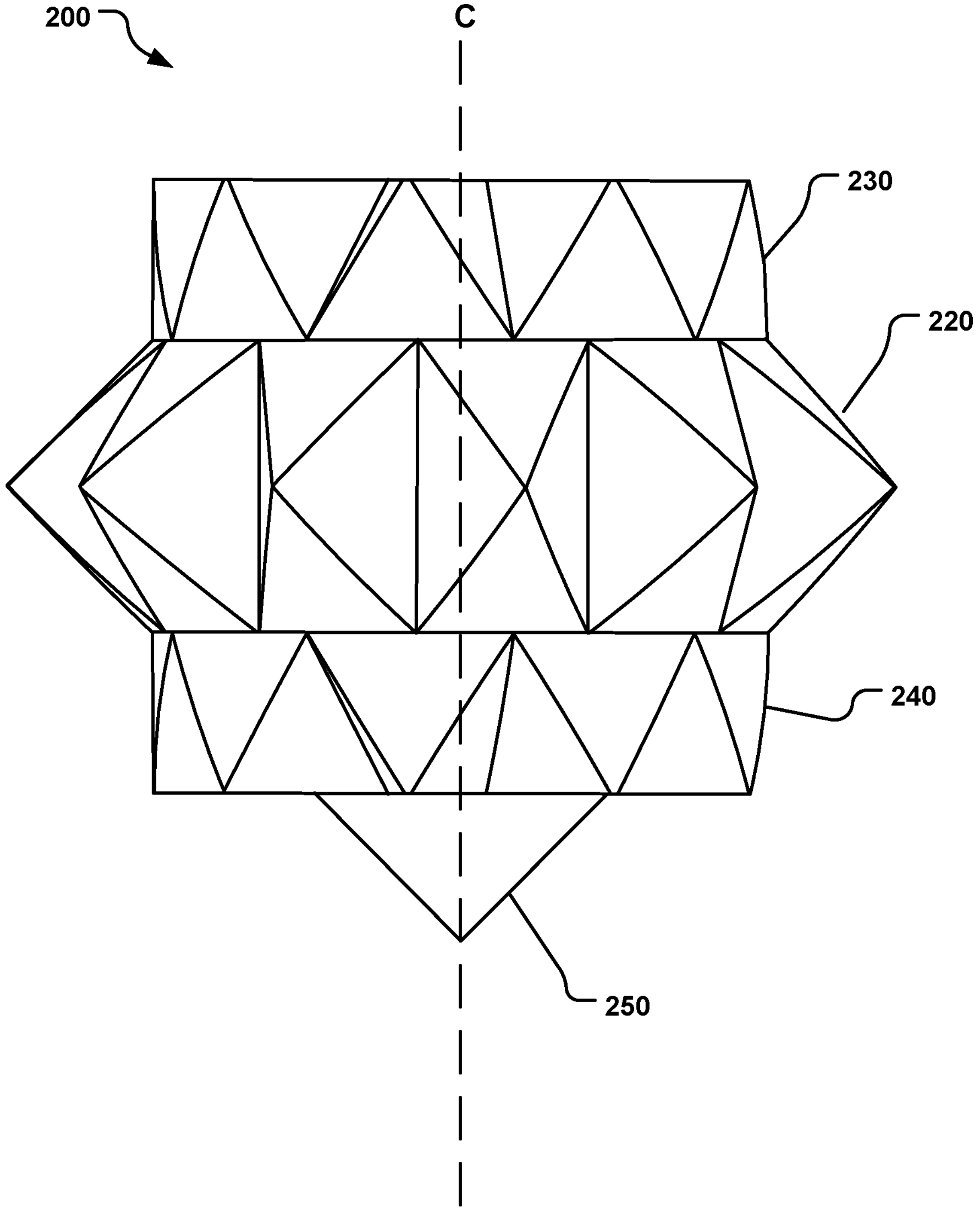
FIG. 3 is a side perspective view of the window breaking device of FIG. 2.
Figure 4:
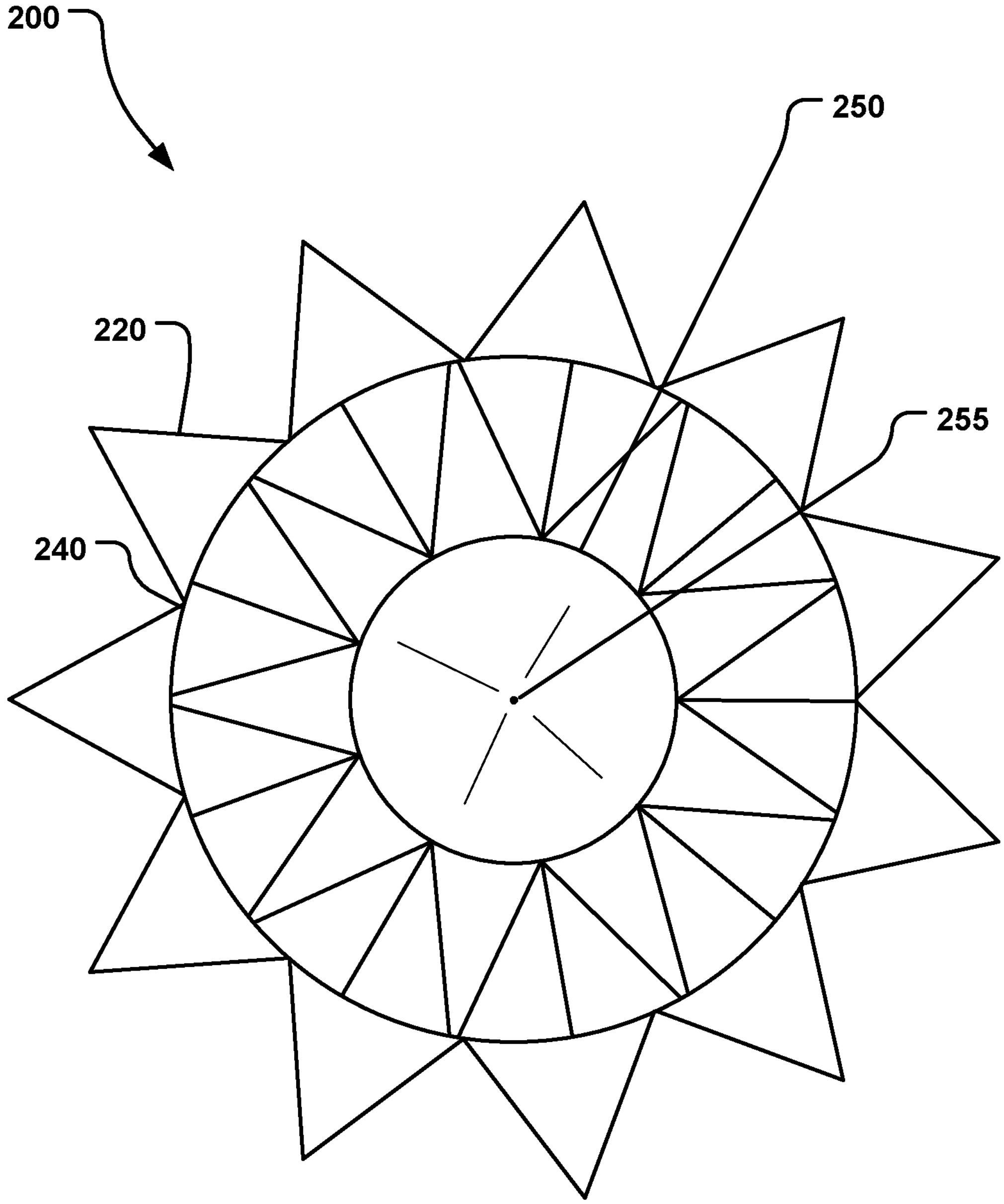
FIG. 4 is another side perspective view of the window breaking device of FIG. 2.

Best seen in FIGS. 2, 3 and 4, the device 200 has a generally spherical body 205 from which extends numerous pyramidal point structures 210 and one conical point structure 250. As seen in the figures, the device 200 has three circumferential rows of the point structures 210 around the body 205, a center row of structures 220 positioned at the equator of the body 205 and two outer rows of structures 230, 240, with the conical point structure 250 centered in and surrounded by the outer row 240. The conical point structure 250 defines an axis C (see, FIG. 4) through the body 205 around which the rows are centered, the axis C passing through a point 255 of the point structure 250.

Each of the structures 220, 230, 240 (in the rows) is a four-sided pyramid, with the pyramids in the two outer rows having non-rectangular (e.g., trapezoidal) bases, with adjacent pyramidal structures being in contact with each other at their bases.

The device 200 has approximately 15 point structures per square inch of surface area.

As indicated above, the body 205 has a diameter of at least 0.25 inch and no more than 3 inches, often no more than 2.5 inches. In some implementations, the body 205 has a diameter of at least 0.5 inch or at least 0.75 inches. In some implementations, the body 205 has a diameter no greater than 2 inches or no greater than 1.5 inches. Non-limiting example diameters include 0.75 inch, 0.8 inch, 0.85 inch, 0.9 inch, 1 inch, 1.1 inch, 1.2 inch, and 1.25 inch.

In some implementations, such as the device 200, it is difficult to determine the diameter of the body 205, e.g., due to the high density of the point structures on the body 205, e.g., where the bases of adjacent point structures abut so that access to the body 205 is unavailable. In such situations, the overall diameter of the device 200 is at least 0.25 inch and no more than 3 inches, often no more than 2.5 inches. In some implementations, device 200 has a diameter of at least 0.5 inch or at least 0.75 inches. In some implementations, the device 200 has a diameter no greater than 2 inches or no greater than 1.5 inches. Non-limiting example diameters include 0.75 inch, 0.8 inch, 0.85 inch, 0.9 inch, 1 inch, 1.1 inch, 1.2 inch, and 1.25 inch.

Figure 5:
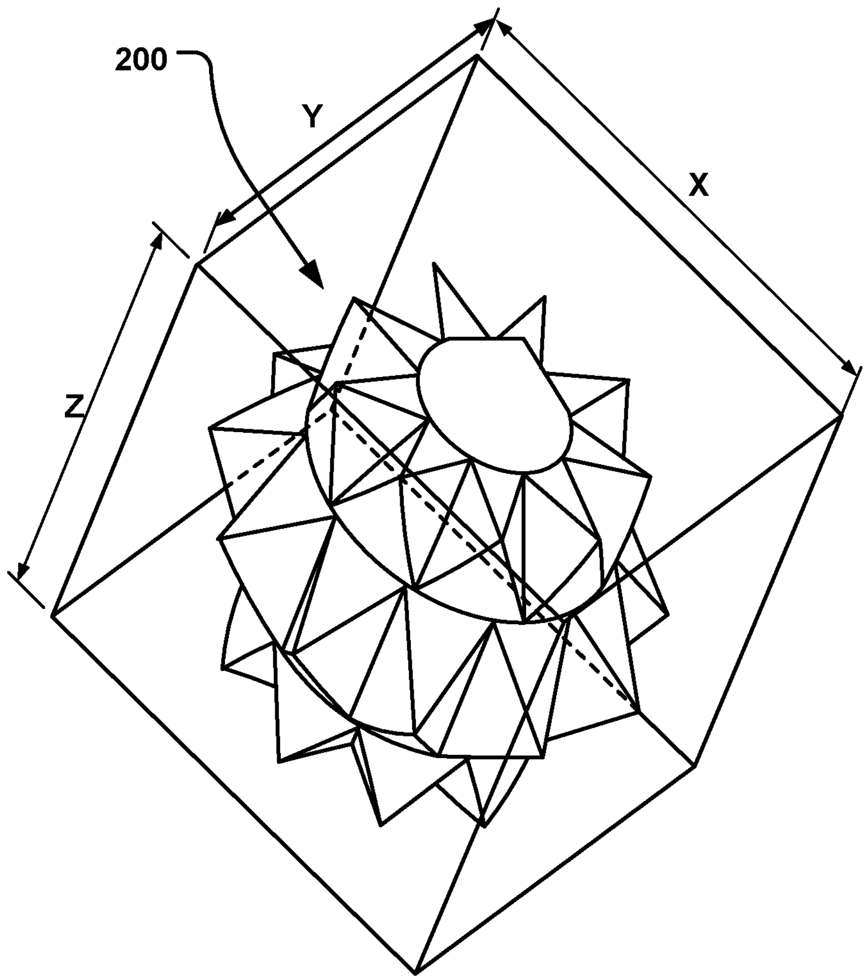
FIG. 5 is another perspective view of the window breaking device of FIG. 2 having dimensions shown thereon.

FIG. 5 shows the window breaking device 200 annotated with dimension directions X, Y, Z, for representing the dimensions in those directions. The diameter of the body 205 or of the device 200 can be measured in any one of these directions X, Y, Z.

In some implementations, the device 200, overall, does not have a perfectly cubically-defined shape, where the dimension in the X direction equals the dimension in the Y direction and equals the dimension in the Z direction, but rather, at least one of the dimensions in the X, Y, Z dimensions is different than the other two. One specific example of the device 200 has the X dimension as 0.988 inch, the Y direction as 0.978 inch, and the Z direction as 0.838 inch; the Z direction dimension is less due to there being no conical point structure on the side opposite the conical point structure 250. When a device 200 with these dimensions is made from 1040 carbon steel, its weight is 1.16 ounces.

Figure 6:
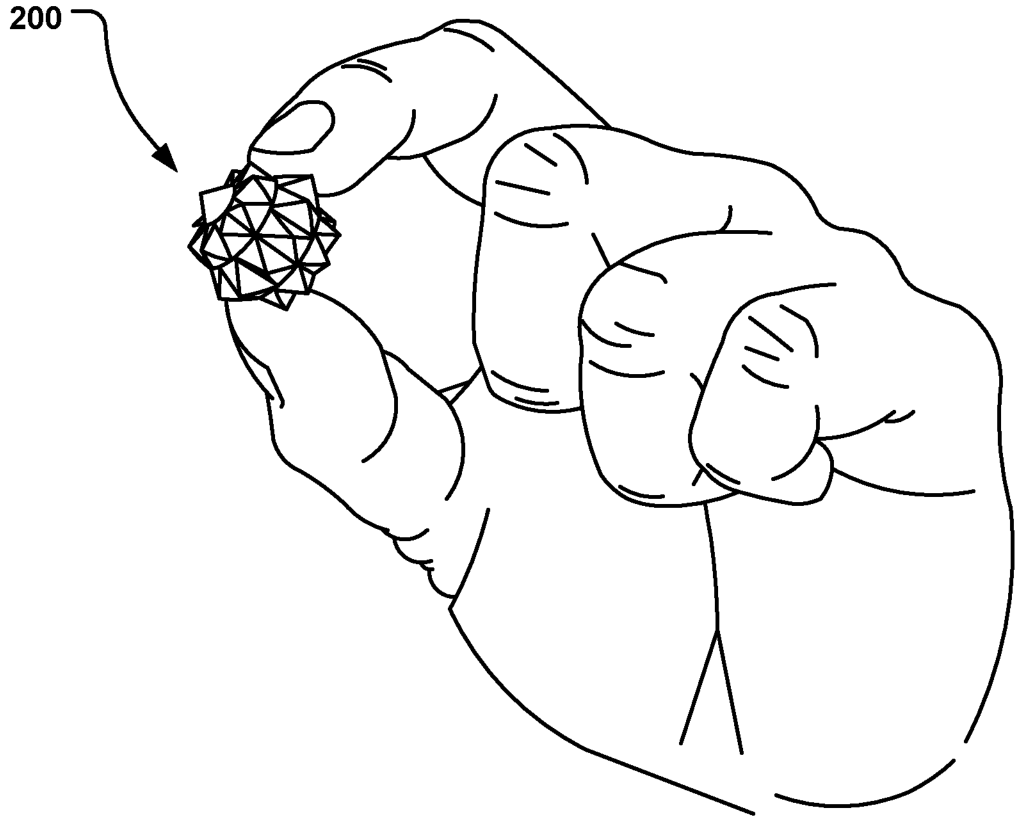
FIG. 6 is a perspective view of the window breaking device of FIG. 2 being held by a person.

To break a window (e.g., a car window, a house window) or other glass feature, any of the window breaking devices described herein is merely thrown, by a person, against the window. FIG. 6 shows a person's hand holding the device 200; it is seen that the device 200 can be readily held and controlled during throwing with as few as two fingers. Multiple devices 200 (e.g., two, three) can be easily held in the palm of the hand. The toss of the device 200 towards the target window may be overhand or underhand or sidearm, or any other way. More than one window breaking device may be thrown simultaneously. It is not necessary to use a secondary device such as a slingshot, throwing handle, or other device to increase the force or speed with which the device travels.

As one of the tips of the point structures of the device contacts the window, it sufficiently damages (e.g., scratches, chips) the window to affect the integrity of the window. It is not necessary to aim or orient the device in any particular manner before or during the throw; any of the point structures may be the first to contact the window. Due to the high density of the point structures (e.g., abutting), a point structure will contact the window before the base orb.

With the integrity of the window compromised, the window can be readily broken completely through by the device, even with the device having a small, compact size.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. For example, elements or features of one example, embodiment or implementation may be applied to any other example, embodiment or implementation described herein to the extent such contents do not conflict. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

The invention claimed is:

1. A device having a body with a central axis with at least 20 pyramidal point structures arranged in three circumferential rows around the axis, an axial conical point structure extending from the body, and no axial conical point structure on a side of the body opposite the axial conical point structure, with each of the pyramidal point structures and the axial conical point structure having a height of at least 0.1 inch and comprising steel, iron, or ceramic, the device having an overall maximum diameter of 0.5 inch to 1.5 inch, a weight of 0.5 ounce to 3 ounces, and a density of all the point structures of at least 5 points per square inch, wherein all of the pyramidal point structures are arranged in the three circumferential rows with the axial conical point structure positioned centrally within one of the three circumferential rows.

2. The device of claim 1, wherein the density of all the point structures is at least 15 points per square inch.

3. The device of claim 1, wherein the pyramidal point structures are arranged on the body so that bases of adjacent pyramidal point structures abut.

4. The device of claim 1, wherein the overall maximum diameter is 0.75 inch to 1 inch.

5. The device of claim 4 having a non-cubically defined shape.

6. The device of claim 1, wherein the weight is 0.5 ounce to 2 ounces.

7. A method of breaking glass, the method including throwing a device against the glass and breaking the glass, the device having a body with a central axis with a plurality of pyramidal point structures arranged in three circumferential rows around the axis, an axial conical point structure extending from the body, and no axial conical point structure on a side of the body opposite the axial conical point structure, with each of the pyramidal point structures and the axial conical point structure having a height of at least 0.1 inch and comprising steel, iron, or ceramic, the device having an overall maximum diameter of 0.5 inch to 1.5 inch and a weight of 0.5 ounce to 3 ounces, wherein all of the pyramidal point structures of the device are arranged in the three circumferential rows with the axial conical point structure positioned centrally within one of the three circumferential rows.

8. The method of claim 7, wherein the device has a density of all the point structures of at least 10 points per square inch.

9. The method of claim 7, wherein the plurality of pyramidal point structures of the device are arranged on the body so that bases of adjacent pyramidal point structures abut.

10. The method of claim 7, wherein the overall maximum diameter is 0.75 inch to 1 inch.

11. The method of claim 10, the device having a non-cubically defined shape.

12. The method of claim 7, wherein the weight is 0.5 ounce to 2 ounces.

13. A device having a body and at least 20 pyramidal structures at a density of at least 5 points per square inch extending from the body in three circumferential rows around an axis of the body, with adjacent pyramidal structures of the at least 20 pyramidal structures abutting, an axial conical point structure on a side of the body, and no axial conical point structure on an opposite side of the body, with each pyramidal structure and conical structure having a height of at least 0.1 inch and comprising steel, iron, or ceramic, the device having an overall maximum diameter of 0.5 inch to 1.5 inch and a weight of 0.5 ounce to 3 ounces, wherein all of the pyramidal point structures are arranged in the three circumferential rows with the axial conical point structure positioned centrally within one of the three circumferential rows.

14. The device of claim 13 wherein the axial conical point structure is abutting at least one of the at least 20 pyramidal structures.

15. The device of claim 13, wherein the pyramidal structures are four-sided pyramidal structures.

16. The device of claim 15, wherein at least some of the four-sided pyramidal structures have a trapezoidal base.

* * * * *